United States Patent [19]
Willis

[11] Patent Number: 5,507,069
[45] Date of Patent: Apr. 16, 1996

[54] ARTICULATED CASTER

[76] Inventor: Douglas G. Willis, 2721 Phyllis Cir., Billings, Mont. 59102

[21] Appl. No.: 230,168

[22] Filed: Apr. 20, 1994

[51] Int. Cl.⁶ ..................................................... B60B 33/00
[52] U.S. Cl. ........................................... 16/18R; 16/31 R
[58] Field of Search ............................. 16/18 CG, 18 B, 16/47, 48, 18 R, 31 A, 31 R

[56] References Cited

U.S. PATENT DOCUMENTS

| | | | |
|---|---|---|---|
| 1,622,447 | 3/1927 | Kalberer | 16/47 |
| 2,197,273 | 4/1940 | Lindeman | 16/47 |
| 2,713,179 | 7/1955 | Clifton | 16/47 |
| 3,433,500 | 3/1969 | Christensen | 16/47 |

*Primary Examiner*—Maurina T. Rachuba
*Assistant Examiner*—Donald M. Gurley
*Attorney, Agent, or Firm*—Risto A. Rinne, Jr.

[57] ABSTRACT

An articulated caster is described which provides a base having more than two casters attached thereto and disposed radially away from the approximate geometric center of the base. A pivot arm includes a pivot housing for receiving and maintaining a pivot ball therein. The pivot housing and pivot ball respectively each are provided with a pivot housing hole and a pivot ball hole which align together when the pivot ball is correctly disposed within the pivot housing. The pivot arm is pivotally attached to the base about a point that is disposed within the pivot ball by a shaft passing through the pivot ball hole, the pivot housing hole, and a pair of holes formed in opposing side walls of the base. According to a preferred modification, an angled slot is provided that is disposed in at least one side of the pivot housing having a width approximately equal to the diameter of the pivot ball hole. The angled slot is preferably disposed so that the bottom thereof is generally in closer proximity to a front of the base than is the top of the angled slot. The shaft passes through and cooperates with the angled slot so that the side to side pivotal motion of the pivot arm with respect to the front of the base is limited to the motion by the shaft within the area as defined by the angled slot.

21 Claims, 4 Drawing Sheets

ARTICULATED CASTER

BACKGROUND OF THE INVENTION

1. Field of the Invention

The present invention, In general, relates to apparatus used as casters and, more particularly, to castering types of devices that accommodate uneven or irregular surfaces.

Casters are well known devices that assist in the mobility of a great variety of types of equipment. They are used in industry, in the home, in the medical field, and in general whenever it is desirable to move objects over a surface.

While casters function well on smooth surfaces they tend to operate less efficiently when used on uneven surfaces or surfaces which contain irregularities, or when small objects placed upon the surface are encountered by the casters. Accordingly casters have been devised which are better adapted to maneuver over uneven surfaces. However, such prior types of devices have functional characteristics which limit their suitability for certain applications.

Certain types of casters when used on uneven surfaces are inherently unstable and can cause objects supported by them to easily tip. The possibility of tipping is increased under certain circumstances, such as when changing direction or when such a type of caster is supporting and moving a load and then encounters an object on the surface which tends to restrict its forward travel.

This is because a typical caster includes a support post that is offset a distance away from the wheel axle. The load that is supported by such types of casters bears down through the support post thereby producing a tipping moment relative to the wheel axle which can, under certain conditions, make the load unstable.

Not by way of limitation but rather by way of example of an application where the above described difficulty associated with prior types of casters is realized can be found by examining the front casters of presently designed wheelchairs which tend to resist changes in direction and can at times become unstable when either direction is changed or the person sitting in the wheelchair changes his position in the chair, such as when he or she leans forward.

The reason that a change in direction is resisted by such prior types of casters is also, as was hereinabove described, attributable to an offset between the support post and wheel axle of the prior caster type. The offset is also responsible for introducing the instability that arises when the occupant leans forward.

Other certain special types of casters significantly and abruptly change their height when contacting objects on the surface. This, in turn, causes a bump which appears to abruptly change the height of the object that is supported by such a caster.

Still other prior types of casters are able to operate only one time, and must be reset after encountering an object. Still yet other prior types of casters tend to impact with objects located upon the surface, or when they encounter uneven surfaces, which in turn results in shock being transferred to the object thus supported.

Accordingly there exists today a need for a caster that is articulated to accommodate uneven surfaces and which is inherently stable.

2. Description of Prior Art

Casters are, in general, known. For example, the following patents describe various types of these devices:

U.S. Pat. No. 301,925 to Roux, Jul. 15, 1884;
U.S. Pat. No. 344,988 to Richmond, Jul. 6, 1886;
U.S. Pat. No. 1,622,447 to Kalberer, Mar. 29, 1927;
U.S. Pat. No. 1,666,139 to Johnson, Apr. 17, 1928;
U.S. Pat. No. 2,123,707 to Bloch, Jul. 12, 1938;
U.S. Pat. No. 3,433,500 to Christensen, Mar. 18, 1969;
U.S. Pat. No. 4,053,129 to Graff, Oct. 11, 1977;
and UK patent No. 4822 to Kendrick's Dec. 18, 1877.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide an articulated caster that is adapted for use over uneven surfaces.

It is also an object of the invention to provide an articulated caster that is adapted for traversing over objects upon the surface that result in a change in the level of the grade.

Another object of the invention is to provide an articulated caster that is stable in use.

Still another object of the invention is to provide an articulated caster that effectively utilizes a portion of the inertia of the object being moved to adapt the caster for traversing over uneven surfaces or changes in the level of the grade of the surface.

Yet another object of the invention is to provide an articulated caster that is self righting when placed from a suspended position above the surface into a position of contact with the surface.

Still yet another object of the invention is to provide an articulated caster that requires less force to change direction.

Still yet another very important object of the invention is to provide an articulated caster that can be steered.

Briefly, an articulated caster that is constructed in accordance with the principles of the present invention has a base assembly comprised of three or more wheels extending radially away from the center of the base. The three wheels are in contact with the grade surface. A pivot arm having an upper end and a lower end is provided that includes a pivot housing that is attached at the lower end thereof. The upper end is provided to attach the pivot arm to the apparatus utilizing the articulated caster. The pivot housing includes a spherical chamber that is adapted to receive and to contain a pivot ball therein which is able to pivot within the pivot housing. The pivot ball includes a pivot hole which is adapted to receive a pivot shaft. The pivot housing includes an angled slot formed into one side thereof at a minimum, the width of the angled slot being approximately the same as the diameter of the pivot shaft and preferably being disposed at an angle offset from the vertical with respect to the grade surface. The pivot shaft passes through the pivot hole of the pivot ball, the angled slot of the pivot housing, and through a pair of pivot shaft holes that are formed through opposing walls of a recess area that is formed in the base. The pivot shaft holes are disposed as low as possible in the recess area provided in the base for improved stability. The pivot arm is thus provided with a substantial range of pivotal motion of the arm within the recess area forward and back and side to side, however any twisting of the pivot arm about the axis of the longitudinal center of the pivot arm is transferred through the pivot shaft and accordingly to the base to change the orientation of the base. The pivot shaft cooperates with the angled slot when an uneven grade is encountered resulting in the base portion being simultaneously tilted and also rotated slightly with respect to the longitudinal axis of the pivot arm. The rotational displacement in cooperation with the vertical displacement serve to adapt the inertia of the moving castered system to soften impact when uneven surfaces are encountered while also providing a method of adapting the caster to accommodate abrupt changes in grade.

DETAILED DESCRIPTION OF THE INVENTION

Figure 1:
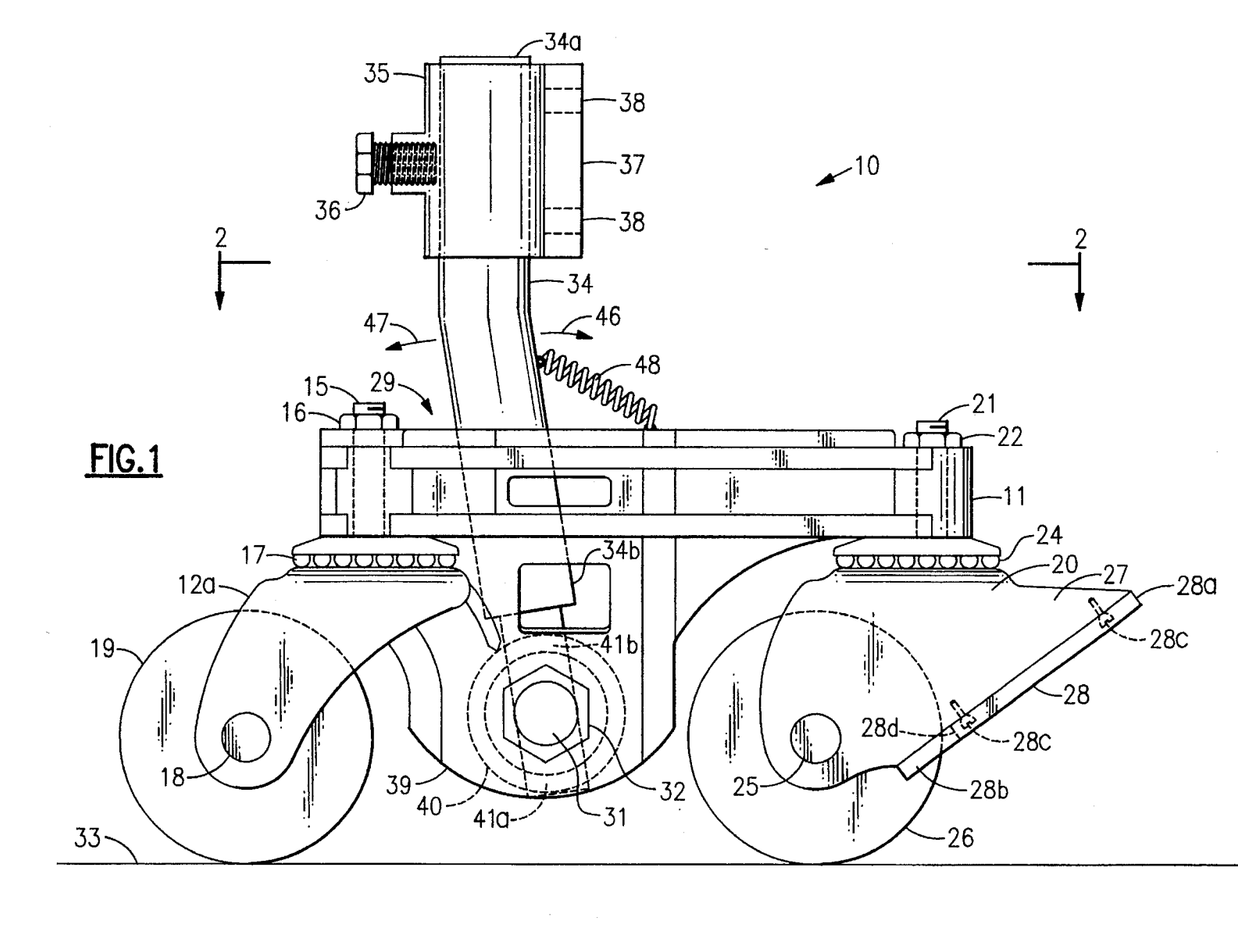
FIG. 1 is a side view of an articulating caster upon a level grade surface.

Referring to FIG. 1 in particular and to all of the FIGURE drawings on occasion is shown, an articulated caster, identified in general by the numeral 10.

A base 11 is provided for attaching the component parts of the articulated caster 10 thereto, as is described in greater detail hereinbelow.

The base 11 may be formed of a stamped metal plate (not shown), or from a casting of metal, plastic, composite materials or from an assemblage of various components, which together, would then form a base assembly (not shown). Although the term "base 11" is used throughout this specification, any type of a "base assembly" (not shown) which includes the attributes necessary to attach the various component parts thereto is anticipated as well for use as the base 11.

A pair of trailing casters 12a, 12b (Only one trailing caster 12a is visible in FIG. 1 drawing. The second trailing caster 12b is disposed a distance away from and behind the one trailing caster 12a that is shown.) support the rear of the base 11.

Figure 2:
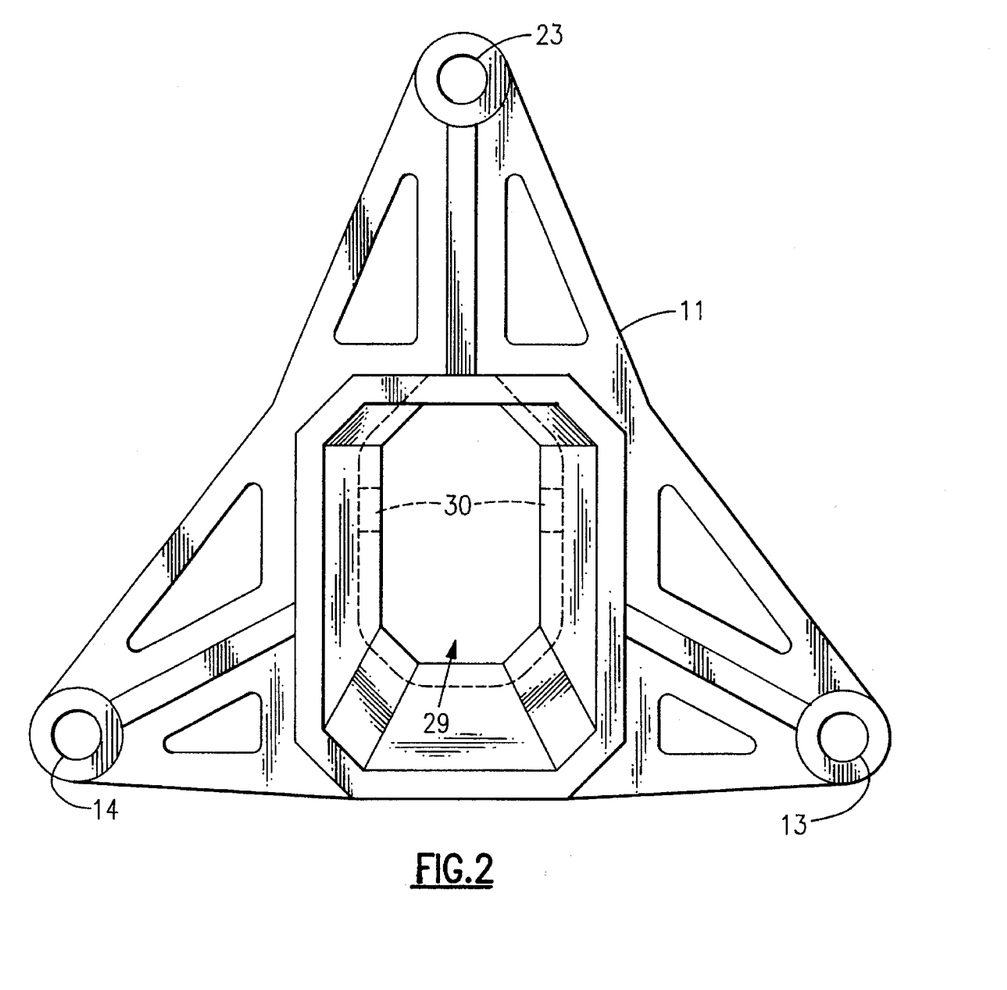
FIG. 2 is a top view of the base only of the articulating caster taken along the line 2—2 of FIG. 1.

Referring also to FIG. 2, the one trailing caster 12a is attached through a first hole 13 to the base 11. The second trailing caster 12b is attached through a second hole 14 to the base 11.

The pair of trailing casters 12a, 12b each rely upon a bolt 15 and a nut 16 (Only one bolt 15 and one nut 16 for the one trailing caster 12a is shown.) for securing to the base 11.

The pair of trailing casters 12a, 12b each pivot freely about the longitudinal axis of each bolt 15 to accommodate changes in direction. A series of ball bearings 17 is provided with each of the pair of trailing casters 12a, 12b to permit rotation about the longitudinal axis of each bolt 15 to freely occur.

A trailing caster axle 18 is provided for each of the pair of trailing casters 12a, 12b to permit the trailing wheels 19 to rotate about.

A front caster 20 is provided and is attached to the base 11 by a front bolt 21 and a front nut 22 passing through a third hole 23 in the base 11.

The front caster 20 pivots about the longitudinal axis of the front bolt 21, and is both supported and aided to this end by a front series of ball bearings 24.

A front caster axle 25 is provided for allowing the front wheel 26 to rotate.

The front caster 20, and the pair of trailing casters 12a, 12b together form a stable support for the base 11. Of course, more than three casters (not shown) in total can be attached to the base 11, but a minimum of three casters are required for stability.

The front caster 20 includes, according to a modification, an extended nose portion 27. Attached to the extended nose portion 27 is a skid plate 28. The skid plate 28 inclines from a first end 28a that is disposed at a higher elevation further away from the front wheel 26 to a second end 28b that is disposed at a lower elevation closer to the front wheel 26. The skid plate 28 surrounds both sides of the front wheel 26 and therefore includes a notched area (Identified in FIG. 1 by reference numeral 28d, as a hidden line.) in the general vicinity of the second end 28b.

The articulated caster 10 is attached to whatever load (not shown) it is intended to support and transport so as to orient the front caster 20 so that it projects forward in the direction of most frequent travel.

For example, if the articulated caster 10 were attached so as to replace the original front caster wheels of a wheelchair (not shown), then each of the original front caster wheels would be replaced by an articulated caster 10. The mounting of each of the articulated casters 10 to the wheelchair (The actual mounting of the articulated caster 10 is described in greater detail hereinbelow.) is accomplished so as to orient each of the front casters 20 towards the front of the wheelchair.

Accordingly, the skid plate 28 forms a leading edge which is present to contact any obstruction (not shown) that is encountered. The inertia of the moving system (Which includes the load being carried plus the articulated caster 10) conveys the skid plate 28 up and over the obstruction to a degree necessary to permit the front caster wheel 26 to then roll over the top of the obstruction. Once the front caster wheel 26 has rolled on top of the obstruction, the remainder of the articulated caster 10 is able to follow.

Another advantage provided by the skid plate 28 is that the first end 28a (highest) is higher than the center of the front caster axle 25. Typically a caster, as well as any wheel in general, is prevented from climbing over any obstruction that contacts the wheel above the center of its axle. Normally, an abrupt stop occurs under such circumstances.

However, the articulated caster 10 is able to traverse over an obstruction that is higher than the front caster axle 25 (which would abruptly stop a typical caster) provided the obstruction is also lower than the first end 28a of the skid plate 28. Of course any wheeled device, including the articulated caster 10 can be abruptly stopped by a severe obstruction.

The outside surface of the skid plate 28 is preferably constructed of a low friction material to aid in traversing over obstructions. The skid plate 28 is attached to the extended nose portion 27 of the front caster 20 by whatever method is preferred such as by adhesive or by recessed screws 28c which are countersunk below the surface to prevent the recessed screws 28c from engaging with any obstruction encountered by the skid plate 28. Accordingly the skid plate 28 is regarded as a wear item that is replaced when necessary.

The base 11 includes a recess area, identified in general (FIGS. 1 and 2) by the reference numeral 29. Disposed as low as possible in the recess area 29 is provided a pivot shaft hole 30 that is formed entirely through both sides of the recess area 29.

The pivot shaft hole 30 is adapted to receive a pivot shaft 31 which is secured to the base 11 by a shaft nut 32 cooperating with threads 31a attached to the pivot shaft 31.

Ideally the pivot shaft hole 30 is disposed so as to be either on or preferably below the plane as are disposed the trailing caster axles 18 and the front caster axle 25 with respect to elevation above the grade surface 33. A low mounting position for the pivot shaft hole 30 is the most stable for it ensures that when any obstruction is encountered, a large tipping moment is not generated by a pivot arm 34 at the pivot shaft hole 30 with respect to the front caster axle 25.

The location of the pivot shaft hole 30 is elevated only to provide for sufficient clearance for the bottom of the recess area 29 of the base 11 as is required above the grade surface 33. When the articulated caster 10 is used over plush carpet (not shown) a higher clearance is preferred than when it is used over smooth surfaces such as upon vinyl floor coverings (not shown), for example.

The pivot arm 34 includes an upper end 34a and a lower end 34b. An intermediate fastener is attached near to the upper end 34a including a mounting plate 35 and a longitudinal hole (not shown) adapted to fit over the pivot arm 34. The mounting plate 35 is secured to the pivot arm 34 by tightening a mounting screw 36 which cooperates with screw threads in the mounting plate 35 and bears upon the pivot arm 34 when tightened thus securing the mounting plate 35 in position with respect to the pivot arm 34.

The mounting plate 35 includes an adapter surface 37 that is adapted for attaching the articulated caster 10 to an object (not shown) for use. The adapter surface 37 includes two mounting holes 38 for receiving a pair of mounting bolts (not shown) therein useful for fastening the adapter surface 37 to the object.

Those skilled in the art will now readily appreciate that other methods of attaching the articulated caster 10 to an object are available, including but not limited to, direct attachment of the pivot arm 34 to the object itself, (As also shown by FIG. 1 when the pivot arm 34 is considered to be the object (load) itself such as is the case when the pivot arm 34 is an integral component of the object.), or by use of a modified mounting plate (not shown) to attach the pivot arm 34 to an object.

The recess area 29 of the base 11 includes an outer housing 39. The location, size, and other attributes of the front caster 20 and the pair of trailing casters 12a, 12b are selected to satisfy the desired load carrying requirements of the articulated caster 10 and also to satisfy certain physical requirements of construction. For example, the geometry of the front caster 20 and the pair of trailing casters 12a, 12b is selected to prevent contact by any part of the front caster 20 and the pair of trailing casters 12a, 12b with the outer housing 39.

Construction of the geometry of the base 11 is varied as necessary to ensure that the first hole 13, the second hole 14, and the third hole 23 provide a proper mounting location for the front caster 20 and the pair of trailing casters 12a, 12b that does not result in mechanical interference with any portion of the outer housing 39.

Figure 3:
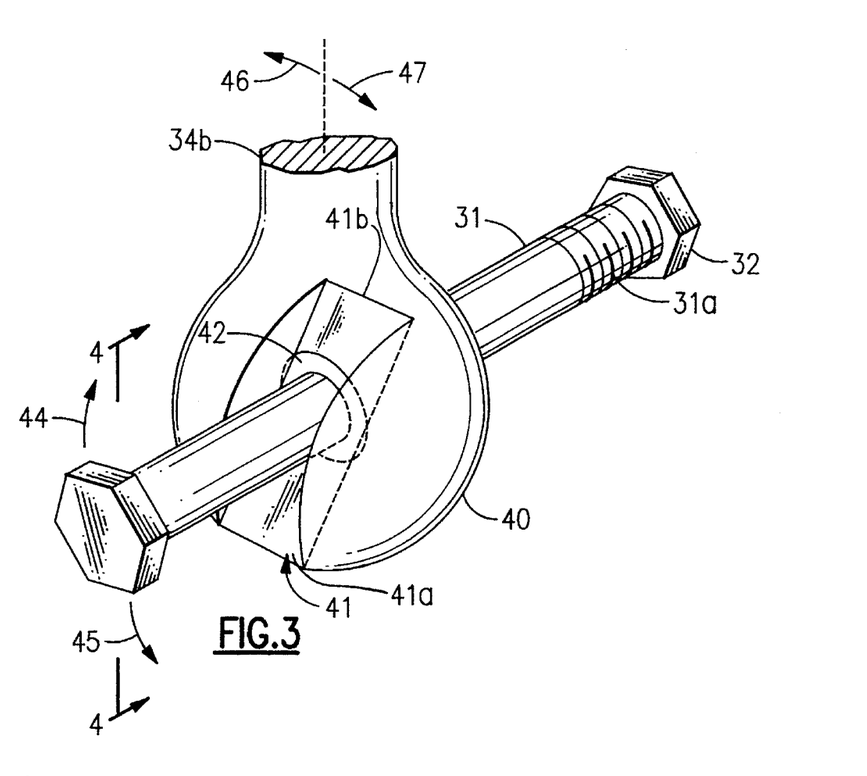
FIG. 3 is a view in perspective of the pivot ball mount of the articulating caster removed apart from the base portion to reveal detail of construction.
Figure 4:
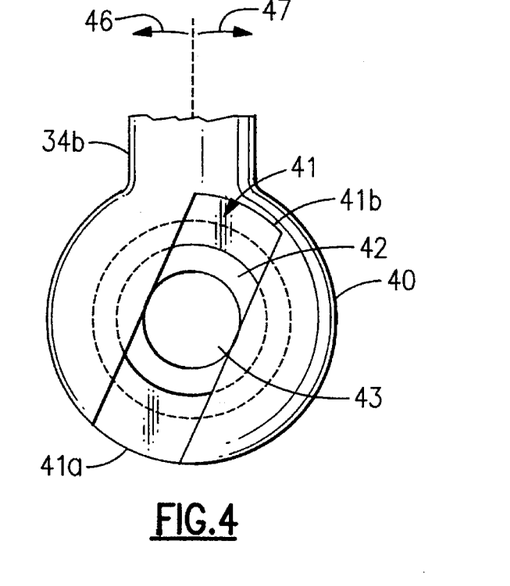
FIG. 4 is view of the pivot ball mount taken along the line 4—4 of FIG. 3.

Referring primarily to FIG. 3 and FIG. 4, attached to the lower end 34b of the pivot arm 34 is a pivot housing 40. The pivot housing 40 preferably includes an angled slot 41 that is formed into one side, at a minimum, of the pivot housing 40. For certain types of modified pivot housings (not shown), it is necessary to provide a second angled slot (not shown) that is disposed parallel to the angled slot 41, but on the opposite side of the modified pivot housing with respect to the angled slot 41.

A pivot ball 42 is captured inside the pivot housing 40 and is free to rotate therein as is further described hereinbelow. The pivot housing 40 must contain a spherical chamber (not shown) that is adapted to receive and to retain the pivot ball 42, according to methods known in the construction of pivoting types of ball joints.

In the FIG. 3 and FIG. 4 drawings, only a portion of the pivot ball 42 that is visible from outside of the pivot housing 40 is shown. A portion of the pivot ball 42 that is contained inside of the pivot housing 40 is therefore not visible.

The pivot ball 42 includes a pivot hole (identified by reference numeral 43, FIG. 4) that is adapted to receive the pivot shaft 31 therein. The diameter of the pivot hole 43 is normally nearly equal to the width of the angled slot 41, for reasons as are described in greater detail hereinbelow.

However, if preferred, a bushing (not shown) is applied over the pivot shaft 31 on either side of the pivot hole 43. Bushings are well known methods of reducing friction and of providing a surface which can rotate with respect to another. Accordingly the use of a bushing over the pivot shaft 31 permits smoother functioning of the articulated caster 10 to occur.

When a bushing is applied over the pivot shaft 31, the diameter of the angled slot 41 is of necessity increased to nearly approximate the outside diameter of the bushing, which must therefore cooperate with the angled slot 41 in lieu of the pivot shaft 31.

The side of the pivot housing 40 that is to the rear of the FIG. 3 and FIG. 4 drawings and therefore is not visible, also holds captive the pivot ball 42 which is substantially exposed and free to rotate about any axis on the not visible side of the pivot housing 40. The pivot hole 43 is similarly exposed on the not visible side of the pivot housing 40.

Accordingly, the pivot ball 42 would be free to rotate about any axis as a sphere contained within the inner sphere of the pivot housing 40 were it not for the pivot shaft 31 which serves also to limit the range of possible motion that can be experienced by the pivot ball 42. The other function of the pivot shaft 31 is to provide a method of accomplishing the pivotal attachment of the pivot arm 34 with the base 11, as is described in greater detail hereinbelow.

The pivot shaft 31 is free to allow the pivot ball 42 to rotate within the pivot housing 40 within the area defined by the angled slot 41 and shown by an arc that is prescribed by a pair of arrows 44 and 45 in the FIG. 3 drawing. Without the space that is provided by the angled slot 41, the pivot shaft 31 would engage with the pivot housing 40 and there could correspondingly be no pivotal motion of the pivot ball 42 or pivot shaft 31 along the arc prescribed by the arrows 44 and 45.

As the pivot housing 40 provides no restriction to rotation of the pivot arm 34 about the longitudinal axis of the pivot shaft 31, the pivot arm 34 is able to rotate about the longitudinal axis of the pivot shaft 31 as is shown in an arc that is prescribed by the pivot arrows 46 and 47 as shown in FIG. 1, FIG. 2, and FIG. 3. The only factor which limits motion of the pivot arm 34 about the arc prescribed by pivot arrows 46 and 47 is when the pivot arm 34 contacts the inside of the recess area 29 of the base 11.

Therefore the pivot arm 34, the pivot housing 40, the pivot shaft 31, and the pivot shaft hole 30 cooperate to permit a method of coupling an object supported by the articulated caster 10 with the base 11 so that pivoting of the pivot arm 34 about the longitudinal axis of the pivot shaft 31 can occur.

As the pivot shaft 31 fits snugly within the pivot hole 43, and also because, as mentioned hereinabove, the diameter of the pivot hole 43 is nearly equal to the width of the angle slot, any attempt to rotate the base 11 of the articulated caster 10 about the longitudinal axis of the pivot arm 34 is resisted and prevented from occurring, unless also accompanied by a tilting of the base 11 over an offset obstruction, as is described in greater detail hereinbelow.

Referring in particular to FIG. 4 and also on occasion to FIG. 1, it is observed that the angled slot 41 is not oriented vertical with respect to the grade surface 33. Rather, the angled slot 41 is constructed as part of the pivot housing 40 at an angle that is disposed away from vertical with respect to the grade surface 33.

Preferably, the angled slot 41 contains a slot bottom 41a that is disposed generally closer towards the front caster 20 than is a slot top 41b. The slot top 41b is disposed generally closer towards the pair of trailing casters 12a, 12b.

Accordingly, when an obstruction that is disposed perpendicular with respect to the articulated caster (not shown) is encountered, it is the front caster 20 that must first make contact with, and then traverse up and over, the obstruction. The pivot arm 34 is able to permit the pivoting of the base 11 of articulated caster 10 along the arc that is prescribed by the pivot arrows 46 and 47 as shown in FIG. 1, FIG. 2, and FIG. 3. The pivoting motion of the base 11 with respect to the pivot arm 34 is to allow the tilting that is necessary for the front caster 20 to surmount the obstruction.

As the articulated caster 10 continues to proceed forward, the outer housing 39 also serves to help to lift the entire base 11 up and over the obstruction until the pair of trailing casters 12, 12b both simultaneously encounter and also pass over the perpendicular obstruction.

Of course, if desired the skid plate 28 of the front caster 20 may also be attached to a pair of modified trailing casters (not shown) to further improve upon the mobility of the articulated caster 10 over obstructions.

However, when an obstruction that is offset (not shown) with respect to the centerline of the articulated caster 10 is encountered so that the offset obstruction makes contact with only one of the pair of trailing casters (12a, for example) at a time, the benefit that is provided by the angled slot 41 is then realized as is explained in greater detail hereinbelow.

If the angled slot 41 were modified (not shown) and placed vertical with respect to the grade surface 33, the trailing caster 12a which first made contact with the offset obstruction would merely raise that portion of the base 11 as the pivot shaft 31 was displaced within a modified angled slot. This would provide some benefit to aid the articulated caster 10 in climbing over an obstruction, but it would not be optimum.

When an offset obstruction is encountered by one of the pair of trailing casters 12a, that side of the base 11 is raised slightly. The angled slot 41 then forces the entire base 11 itself to rotate with respect to the longitudinal axis of the pivot arm 34 while the pivot shaft 31 remains fixed in position with respect to the pivot arm 34.

This occurs because the base 11 is tilted up by the offset obstruction which causes the base 11 to tilt with respect to the pivot shaft 34. However the pivot shaft 34 can only be displaced within the space as is defined by the angled slot 41. Accordingly, whatever side of the base 11 is raised by the offset obstruction, that same side is also deflected slightly rearward with respect to the general direction of travel toward the front.

The rotation of the base 11 thus produced by the pivot shaft 31 cooperating with the angled slot 41 to rotate the base 11 about the longitudinal axis of the pivot arm 34 delays the ascent of the trailing caster 12a that has made contact with the offset obstruction until it has had the opportunity to rise with respect to the obstruction.

Accordingly, the inertia of the object that is being moved by the articulated caster 10 continues to move the object forward while the trailing caster (12a for this particular example) that has contacted the offset obstruction is delayed in its forward travel until after it has been given time to also rise over the obstruction.

The effect is to provide an articulated caster 10 that can more smoothly climb over obstructions which make contact with only one of the trailing casters 12a, 12b, or over obstructions which do not contact both of the trailing casters 12a, 12b at the same time, thereby softening the degree of impact that is caused by such types of obstructions to the object being transported by the articulated caster 10.

The weight of the object being moved continues to bear down through the pivot arm 34 and onto the base 11 and ultimately through the trailing casters 12a, 12b, and also the front caster 20. As soon as the articulated caster 10 has stabilized itself upon the grade surface 33 after having passed over the obstruction (or upon a large obstruction [not shown]), the force that is exerted by the weight of the object causes the pivot shaft 31 to bear down upon the base 11 thereby causing the base 11 to pivot back into a normal orientation whereby each of the trailing casters 12a, 12b track at an equal distance displaced behind the front caster 20 and the general direction of travel.

Accordingly, the articulated caster 10 is able to continually respond to a plurality of obstructions that are encountered during use by raising one side of the base 11 as needed, by rotating rearward the base 11 on the one side that is encountering the obstruction (ie.: the side of the base 11 that is being raised by the obstruction.), and then by seeking the original position of equilibrium as soon as the obstruction has been passed.

This provides an articulating caster 10 that does not need to be reset by an operator (not shown) after encountering each obstruction. In fact, operation is continuous and intervention of any sort is not required between obstructions, providing the magnitude of the obstructions are small enough so as to be surmountable by the articulated caster 10.

The delayed motion that is exhibited by the side of the articulated caster 10 that encounters an obstruction is a deceleration of that side which also results in the simultaneous acceleration of the side opposite thereto.

When the articulated caster 10 is traversing over the grade surface 33 having obstructions that are scattered thereon, the pair of trailing casters 12a, 12b are each intermittently being temporarily obstructed. Accordingly, the alternate side to side acceleration and deceleration as experienced by the articulated caster 10 visually appears as generally, a forward directed motion having also a slight side to side "walking" component to the motion, which in addition to the practical advantages as herein described, is also pleasing to observe.

Under certain applications the articulated caster 10 is, at times, raised above the grade surface 33 by a lifting force that is applied to the pivot arm 34. It is, on occasion, desirable to orient the base 11 in a preferred position with respect to the pivot arm 34 when the articulated caster 10 is raised.

A spring 48 is provided with one spring end attached to the pivot arm 34 and the remaining spring end attached to the base 11. Accordingly when the articulated caster 10 is raised above the grade surface 33, the spring 48 urges the base 11 into a particular orientation with respect to the pivot arm 34.

The spring 48 may apply a force which urges the base 11 away from the pivot arm 34 or conversely, draws the base 11 toward the pivot arm 34, depending upon the type of the spring 48 that is utilized.

It will be understood by those skilled in the caster art, that other changes can be made to the articulated caster 10. For the purpose of providing a more complete disclosure by detailing but a few of the changes that are possible, a modified articulated caster, identified in general by the reference numeral 48a in FIG. 5, is shown.

Figure 5:
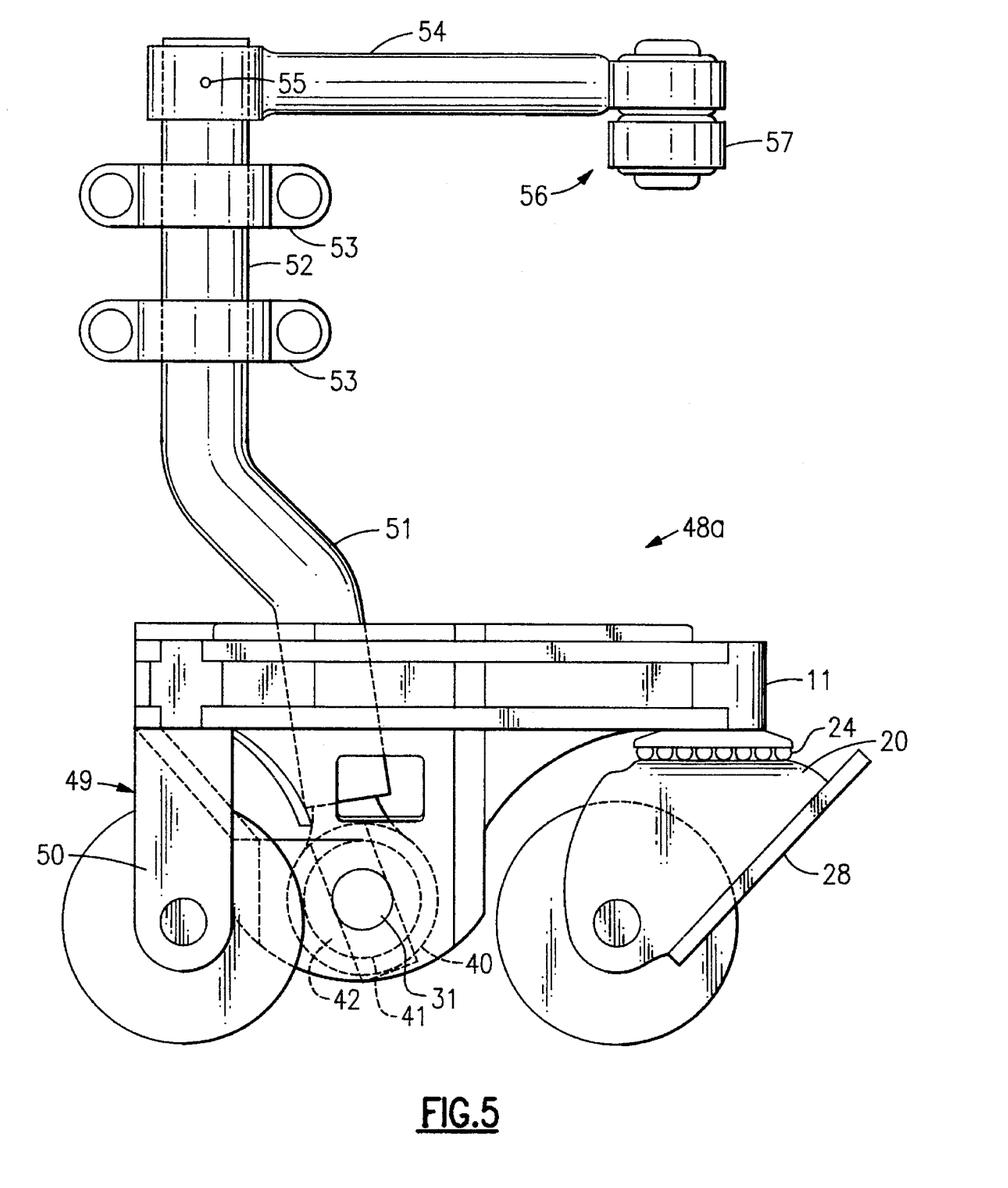
FIG. 5 is a side view of an articulating caster having rigid wheels and a steering linkage attached thereto.

Referring now in particular to FIG. 5, the modified caster 48a includes components similar or identical to that of the articulated caster 10 but with certain key exceptions which are described in greater detail hereinbelow.

Certain of the reference numerals as described hereinabove, and which identify the components that are included with the articulated caster 10, are also referenced hereinbelow in the description of the modified caster 48a, and accordingly these components include identical reference numerals for purposes of clarity and consistency.

The modified caster 48a includes a pair of rigid rear casters 49 (only the one rigid rear caster is shown in the foreground). The pair of rigid rear casters 49 replace the pair of trailing casters 12a, 12b of the articulated caster 10. The pair of rigid rear casters 49 are fixedly attached to the base 11 by a mounting post 50 and do not swivel about a longitudinal axis of the mounting post 50.

A sharply curved pivot arm 51 is provided, which preferably, aligns the longitudinal axis of an upper portion 52 thereof parallel with and in between the longitudinal axes of the mounting post 50 of each of the pair of rigid rear casters 49.

It is not mandatory to maintain any particular relationship among the various longitudinal axes, however when the preferred alignment is achieved, an additional benefit is attained when the modified caster 48a is steered, as is described in greater detail hereinbelow.

The upper portion 52 of the curved pivot arm 51 is held in place by a pair of pillow block bearings 53, each of which is attached to an object (not shown) that is being supported by the curved pivot arm 51 of the modified caster 48a.

The pair of pillow block bearings 53 provide support for the upper portion 52 of the curved pivot arm 51 while permitting the upper portion 52 to rotate about its longitudinal axis. The pair of pillow block bearings 53 also provide and maintain any preferred orientation with respect to the longitudinal axis of the mounting post 50 of each of the pair of rigid rear casters 49 with respect to the longitudinal axis of the upper portion 52.

A steering linkage 54 is shown attached to the top of the upper portion 52 by a pin 55 passing through the upper portion 52 and through the steering linkage 54 itself. If desired, the pin 55 is omitted and the steering linkage 54 is attached to the upper portion 52 by other methods.

The end of the steering linkage 54 opposite to where it is attached to the upper portion 52 includes a ball joint, identified in general by the reference numeral 56. A steering arm 57 (only one end thereof is shown) is attached as part of the ball joint 56 and, during steering, a force is applied through the steering arm 57, to the ball joint 56, to the steering linkage 54, to the curved pivot arm 51, to the pivot shaft, and finally to the base 11 which is urged to rotate with respect to the longitudinal axis of the curved pivot arm 51.

Accordingly a method to steer the modified caster 48a is provided wherein a force is applied through the steering linkage 54, by the steering arm 57. When the preferred orientation of longitudinal axes is maintained, as described hereinabove, each of the pair of rigid rear casters 49 simply rotate about the longitudinal axis of the upper portion 52 while the front caster 20 rotates about the longitudinal axis of its own mounting when the modified caster 48a is thus steered.

Those now further skilled will appreciate, that if desired, the steering arm 57 is replaced by an electro-mechanical actuator (not shown) which is connected to and controlled by the manipulation of a joystick (not shown). Accordingly, the modified caster 48a is well adapted for use with a great variety of devices, including but not limited to, electric types of wheelchairs (not shown) wherein the operator controls both the direction of movement and speed of motion by manipulation of the joystick.

The modified caster 48a is particularly well suited to applications which are steered by supplying a mechanical steering force which is transmitted through the curved pivot arm 51, and eventually to the base 11. It is noted that all of the benefits associated with the pivot housing 40, the pivot ball 42, and the pivot shaft 31 which cooperate with the angled slot 41, as described hereinabove, are available as well with the modified caster 48a.

The modified caster 48a appears, upon an initial and cursory inspection of FIG. 5, to prefer motion in a left to right direction or generally, from the pair of rigid rear casters 49 toward the front caster 20. However in actual use, this is not the situation as the modified caster 48a functions equally well when the direction of apparent preferred motion is reversed and the modified caster 48a, as shown, is instead being conveyed from right to left.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An articulated caster, comprising:
    (a) a base;
    (b) more than two casters attached to said base disposed radially from the approximate geometric center of said base, said more than two casters adapted for contact with a surface; and
    (c) a pivot arm having an upper and a lower end, said upper end including means for attaching said pivot arm to an object and said lower end including means pivotally attaching said pivot arm to said base for limited pivotal motion about a point;

wherein said means pivotally attaching includes:
   a pair of holes formed in opposing side walls of said base;
   a pivot housing attached to said lower end of said pivot arm, said pivot housing including opposing housing side walls and providing an opening on each of said opposing housing side walls that are horizontally aligned with respect to each other;
   said pivot housing adapted to receive and to retain a pivot ball therein, said pivot ball adapted for pivotal motion within said pivot housing and including a pivot ball hole therein wherein said hole cooperates with said opening on each of said opposing housing side walls of said pivot housing to provide an overall opening passing through said pivot housing and said pivot ball; and
   a pivot shaft, said pivot shaft passing through said opening of said pivot housing, said pivot ball hole of said pivot ball, and said pair of holes formed in said opposing side walls of said base.

2. The articulated caster as defined by claim 1 wherein said means for attaching includes intermediate means for fastening said pivot arm to said intermediate means and for fastening said object to said intermediate means.

3. The articulated caster as defined by claim 1 including a recess area formed in said base wherein said pair of holes formed in opposing side walls of said base are provided in opposing side walls of said recess area.

4. The articulated caster as defined by claim 3 wherein said pair of holes formed in said opposing sides are disposed as low as possible in said recess area.

5. The articulated caster as defined by claim 1 wherein said means for attaching includes assembly of said pivot arm integrally with said object.

6. The articulating caster as defined by claim 1 including means for urging said base into a predetermined position with respect to said pivot arm when said articulated caster is raised off of said surface.

7. The articulating caster as defined by claim 6 wherein said means for urging is a spring.

8. The articulating caster as defined by claim 1 wherein said at least one of said more than two casters includes a modified nose portion that is adapted for receiving means for providing a skid plate thereto.

9. The articulating caster as defined by claim 8 wherein said means for providing a skid plate includes means for removing a skid plate to permit the replacing of a worn skid plate with a new skid plate.

10. The articulating caster as defined by claim 1 including means for steering said articulated caster.

11. The articulating caster as defined by claim 10 wherein said means for steering includes means for supporting said pivot arm with respect to an object, said means for supporting adapted to permit the rotation of said pivot arm about a longitudinal axis thereof, and means for urging said pivot arm to rotate about said longitudinal axis thereof.

12. The articulating caster as defined by claim 1 wherein at least one of said more than two casters is attached to said base so as to permit wheeled motion of said at least one of said more than two casters in a direction that is fixed with respect to said base.

13. The articulating caster as defined by claim 1 wherein at least one of said more than two casters is attached to said base so as to permit wheeled motion of said at least one of said more than two casters in a direction that is variable with respect to said base.

14. An articulated caster, comprising:
   (a) a base;
   (b) more than two casters attached to said base disposed radially from the approximate geometric center of said base, said more than two casters adapted for contact with a surface;
   (c) a recess area formed in said base, said recess area including a pair of holes formed in opposing sides thereof;
   (d) a pivot arm having an upper and a lower end, said upper end including means for attaching said pivot arm to an object, said lower end including a pivot housing, said pivot housing including opposing housing sides and providing an opening on each of said opposing housing sides, said pivot housing adapted to receive and to retain a pivot ball therein, said pivot ball adapted for pivotal motion within said pivot housing and including a pivot ball hole therein wherein said pivot ball hole cooperates with said opening on each of said opposing housing sides of said pivot housing to provide an overall opening passing through said pivot housing and said pivot ball;
   (e) a slot formed in at least one of said opposing housing sides; and
   (f) a pivot shaft, said pivot shaft passing through said pivot housing, said opening on each of said opposing housing sides, said pivot ball, said slot, and said pair of holes formed in opposing sides of said recess area;
   whereby said pivot arm is pivotally attached about said pivot ball to said base and is capable of pivotal motion within an area as defined by said recess area and said slot.

15. The articulated caster as defined by claim 14 wherein said means for attaching includes a mounting plate.

16. The articulated caster as defined by claim 15 wherein said mounting plate includes means for fastening said mounting plate to said object.

17. The articulated caster as defined by claim 15 wherein said mounting plate includes means for fastening said mounting plate to said pivot arm.

18. The articulated caster as defined by claim 14 wherein said means for attaching includes assembly of said pivot arm integrally with said object.

19. The articulated caster as defined by claim 14 wherein said pair of holes formed in opposing sides of said recess area are disposed as low as possible to said surface within said recess area.

20. An articulated caster, comprising:
   (a) a base having a base front and a base rear, said base rear being disposed on an opposite end of said base with respect to said base front;
   (b) more than two casters attached to said base disposed radially from the approximate geometric center of said base, said more than two casters adapted for contact with a surface;
   (c) a recess area formed in said base, said recess area including a pair of holes formed in opposing sides thereof;
   (d) a pivot arm having an upper and a lower end, said upper end including means for attaching said pivot arm to an object, said lower end including a pivot housing, said pivot housing including opposing housing sides and providing an opening on each of said opposing housing sides, said pivot housing adapted to receive and to retain a pivot ball therein, said pivot ball disposed for pivotal motion within said pivot housing and including a pivot ball hole therein wherein said pivot ball hole cooperates with said opening on each of said opposing housing sides of said pivot housing to provide an overall opening passing through said pivot housing and said pivot ball;

(e) an angled slot formed in at least one of said opposing housing sides, said angled slot being disposed at an angle that is offset from vertical with respect to said surface; and (f) a pivot shaft, said pivot shaft passing through said pivot housing, said pivot ball, said slot, and said pair of holes formed in opposing sides of said recess area;

whereby said pivot arm is pivotally attached about said pivot ball to said base and is capable of pivotal motion within an area as defined by said recess area and said angled slot.

21. The articulated caster of claim 20 wherein said angled slot includes a slot bottom and a slot top, wherein said slot bottom is disposed closer to said surface and to said front of said base than is said slot top, and said slot top is disposed closer to said rear of said base than is said slot bottom.

* * * * *